(12) United States Patent
Attinella et al.

(10) Patent No.: US 7,483,801 B2
(45) Date of Patent: Jan. 27, 2009

(54) PERFORMANCE COLLECTION COMPENSATION

(75) Inventors: John Michael Attinella, Rochester, MN (US); Edwin C. Grazier, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 11/038,709

(22) Filed: Jan. 20, 2005

(65) Prior Publication Data

US 2006/0161766 A1 Jul. 20, 2006

(51) Int. Cl.
*G01D 18/00* (2006.01)
(52) U.S. Cl. ............................................. 702/85
(58) Field of Classification Search ................. 702/85
See application file for complete search history.

(56) References Cited

U.S. PATENT DOCUMENTS 6,321,373 B1 * 11/2001 Ekanadham et al. ......... 717/119
2005/0261855 A1 * 11/2005 Adachi et al. ............... 702/108

* cited by examiner

Primary Examiner—Bryan Bui
Assistant Examiner—Aditya S Bhat
(74) Attorney, Agent, or Firm—Owen J. Gamon (57) ABSTRACT

A method, apparatus, system, and signal-bearing medium that, in an embodiment, determine a first number of execution cycles used by a calibration program for an event group with a collector inactive, determine a second number of execution cycles used by the calibration program for the event group with the collector active, and calculate a compensation value for the event group based on the difference between the second number and the first number of execution cycles. These determinations and calculations may be repeated for any number of event groups. When performance data is subsequently collected by the collector, collected events that belong to the event groups have their collected execution cycles adjusted based on the calculated compensation values. In various embodiments, a decision is made whether to determine the first and second numbers of execution cycles and calculate the compensation values based on whether a configuration of the computer has changed, whether resource allocation among logical partitions of the computer has changed, or whether a resource was activated under a capacity on demand plan. In this way, the performance effects of the collector may be accounted for in the collected performance data.

15 Claims, 6 Drawing Sheets

PERFORMANCE COLLECTION COMPENSATION

FIELD

This invention generally relates to computer systems and more specifically relates to performance data collection compensation in computer systems.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago. One significant advance in computer technology is the development of parallel processing, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads, so that multiple tasks can essentially be performed at the same time.

In addition, some computers implement the concept of logical partitioning, where a single physical computer is permitted to operate essentially like multiple and independent virtual computers, referred to as logical partitions, with the various resources in the physical computer (e.g., processors, memory, and input/output devices) allocated among the various logical partitions. Each logical partition executes a separate operating system, and from the perspective of users and of the software applications executing on the logical partition, operates as a fully independent computer.

Because each logical partition is essentially competing with other logical partitions for the limited resources of the computer, users are especially interested in monitoring the partitions in order to ensure that they are achieving satisfactory performance. A performance data collection tool that collects detailed performance metrics is often used for this purpose. Since the tool executes on the computer system using the same resources that the partitions may also use, the tool impacts the performance that it is measuring. In order to account for this performance impact and provide an accurate portrayal of the performance characteristics of the computer system being analyzed, the tool needs to accurately quantify the effects that the tool itself has on the collected metrics.

Current performance data collection tools use static compensation values to adjust the collected metrics in order to account for the performance impact of the tools. But, because of the dynamic nature of resource allocation between logical partitions, the environment in which the tool is executing and which the tool is measuring can change quickly and dramatically. Thus, static compensation values might not always provide the desired degree of accuracy.

Without a better technique for adjusting collected performance metrics based on the environment that exists at the time of the collection activity, users will continue to suffer from performance metrics that do not provide the desired degree of accuracy. Although the aforementioned problems have been described in the context of a logically partitioned computer system, they may occur in any environment in which the characteristics of the system being measured can change.

SUMMARY

A method, apparatus, system, and signal-bearing medium are provided that, in an embodiment, determine a first number of execution cycles used by a calibration program for an event group with a collector inactive, determine a second number of execution cycles used by the calibration program for the event group with the collector active, and calculate a compensation value for the event group based on the difference between the second number and the first number of execution cycles. These determinations and calculations may be repeated for any number of event groups. When performance data is subsequently collected by the collector, collected events that belong to the event groups have their collected execution cycles adjusted based on the calculated compensation values. In various embodiments, a decision is made whether to determine the first and second numbers of execution cycles and calculate the compensation values based on whether a configuration of the computer has changed, whether resource allocation among logical partitions of the computer has changed, or whether a resource was activated under a capacity on demand plan. In this way, the performance effects of the collector may be accounted for in the collected performance data.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a performance data collection tool determines compensation values in response to changes in the computer system that may have an effect on the compensation values. These changes include, but are not limited to, processor frequency adjustments, partition migration actions, processor configuration changes, resource allocation changes, resource activations and deactivations under an on demand capacity plan, and memory configuration changes. A user interface may also force the performance collection tools to regenerate compensation values. This user interface may be useful, e.g., in situations where the user wants the compensation values for a particular performance data collection action to be matched as close as possible with the current state of the computing system environment, even if the performance data collection tool has not automatically determined that an adjustment is necessary.

Components in the computer system that cause changes to the current operating environment communicate to the performance data collection tool via an indicator, or other communication means, that such a change in the system has occurred. This indicator is tested, e.g., by the collection tool when a collection action is initiated, such as by a user or other application. If the indicator is set, the tool initiates a sequence of collections using calibration programs with known performance characteristics. The calibration programs are first run without a performance metric collector active and then run with the performance metric collector active. The collection tool compares the execution cycles for the calibration programs and calculates compensation values for groups of events based on the difference between the execution cycles. The collection tool then uses these compensation values on the user requested collection and on subsequent collections. These updated compensation values allow the collection tool to accurately report performance metrics taking into account the effects that the collection tool has on the metrics.

Figure 1:
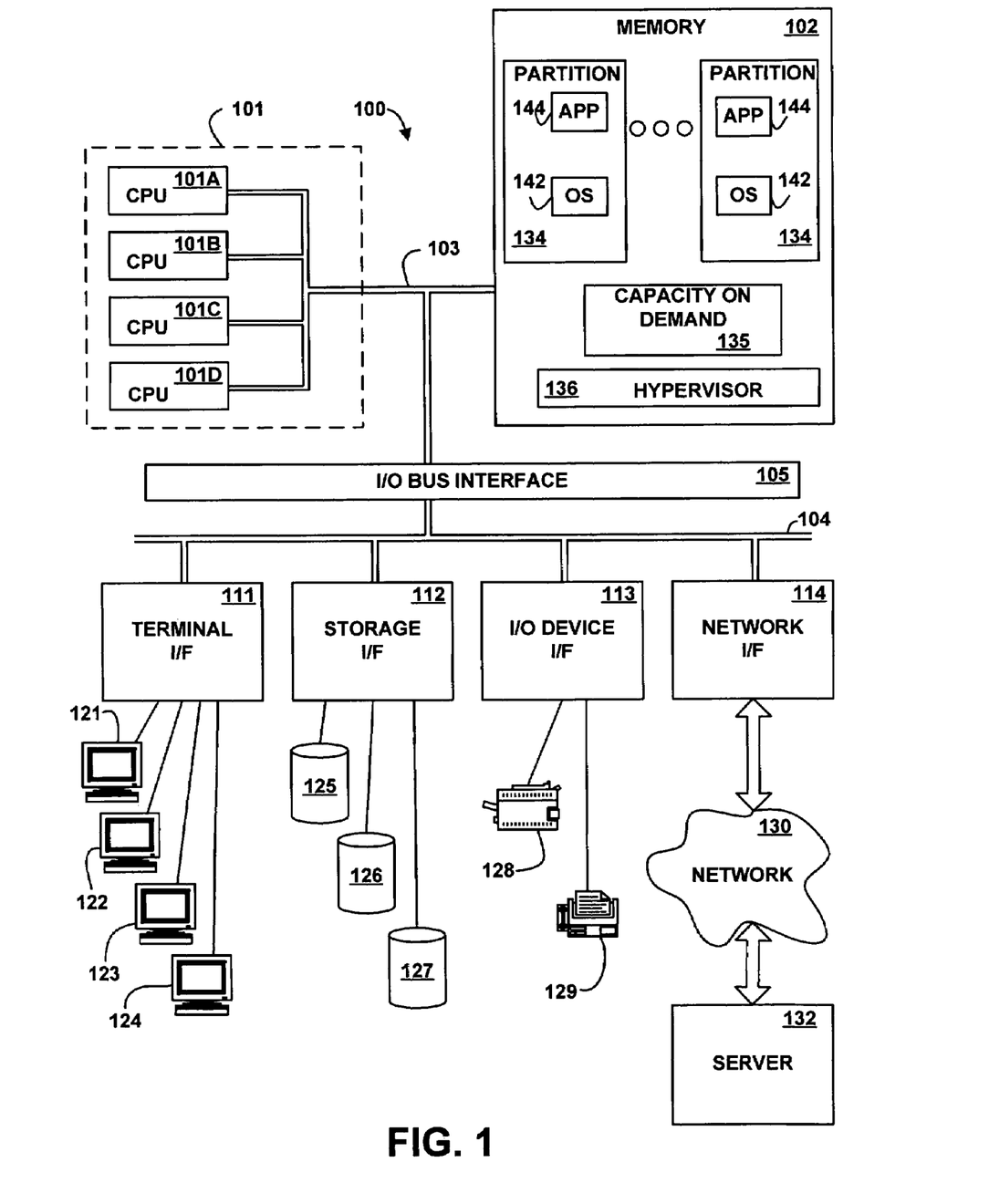
FIG. 1 depicts a high-level block diagram of an example system for implementing an embodiment of the invention.

Referring to the Drawings, wherein like numbers denote like parts throughout the several views, FIG. 1 depicts a high-level block diagram representation of a client computer system 100 connected via a network 130 to a server computer system 132, according to an embodiment of the present invention. The designations "client" and "server" are used for convenience only, and, in an embodiment, a computer that operates as a client to one computer may operate as server to another-computer, and vice versa. In an embodiment, the hardware components of the computer system 100 may be implemented by an IBM eServer iSeries or pSeries computer system. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as containing the primary software components and resources utilized in implementing a logically partitioned computing environment on the computer 100, including a plurality of logical partitions 134 managed by a partition manager or hypervisor 136. The memory 102 further includes a capacity on demand manager 135, which allows customers to effectively rent or lease resources, e.g., processors, memory, or other resources, on an as-needed or on-demand basis. More particularly, customers may temporarily enable standby resources that are initially dormant or unused within their machine. Where desired, the standby resources are not included in the up-front, baseline cost of the machine. As such, for a relatively smaller initial capital investment, a customer may activate and deactivate standby or on-demand resources as needed for a fee, which provides the customer with customized access and optimized usage.

Although the partitions 134, the capacity on demand manager 135, and the hypervisor 136 are illustrated as being contained within the memory 102 in the computer system 100, in other embodiments some or all of them may be on different computer systems, e.g., the server 132, and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the partitions 134, the capacity on demand manager 135, and the hypervisor 136 are illustrated as residing in the memory 102, these elements are not necessarily all completely contained in the same storage device at the same time.

Each of the logical partitions 134 utilizes an operating system 142, which controls the primary operations of the logical partition 134 in the same manner as the operating system of a non-partitioned computer. For example, each operating system 142 may be implemented using the i5OS operating system available from International Business Machines Corporation, but in other embodiments the operating system 142 may be Linux, AIX, UNIX, Microsoft Windows, or any appropriate operating system. Also, some or all of the operating systems 142 may be the same or different from each other. Any number of logical partitions 134 may be supported as is well known in the art, and the number of the logical partitions 134 resident at any time in the computer 100 may change dynamically as partitions are added or removed from the computer 100.

Each of the logical partition 134 executes in a separate, or independent, memory space, and thus each logical partition acts much the same as an independent, non-partitioned computer from the perspective of each application 144 that executes in each such logical partition. As such, user applications typically do not require any special configuration for use in a partitioned environment. Given the nature of logical partitions 134 as separate virtual computers, it may be desirable to support inter-partition communication to permit the logical partitions to communicate with one another as if the logical partitions were on separate physical machines. As such, in some implementations it may be desirable to support an unillustrated virtual local area network (LAN) adapter associated with the hypervisor 136 to permit the logical partitions 134 to communicate with one another via a networking protocol such as the Ethernet protocol. In another embodiment, the virtual network adapter may bridge to a physical adapter, such as the network interface adapter 114. Other manners of supporting communication between partitions may also be supported consistent with embodiments of the invention.

Although the hypervisor 136 is illustrated as being within the memory 102, in other embodiments, all or a portion of the hypervisor 102 may be implemented in firmware or hardware. The hypervisor 136 may perform both low-level partition management functions, such as page table management and may also perform higher-level partition management functions, such as creating and deleting partitions, concurrent I/O maintenance, allocating processors, memory and other hardware or software resources to the various partitions 134.

The hypervisor 136 statically and/or dynamically allocates to each logical partition 134 a portion of the available resources in computer 100. For example, each logical partition 134 may be allocated one or more of the processors 101 and/or one or more hardware threads, as well as a portion of the available memory space. The logical partitions 134 can share specific software and/or hardware resources such as the processors 101, such that a given resource may be utilized by more than one logical partition. In the alternative, software and hardware resources can be allocated to only one logical partition 134 at a time. Additional resources, e.g., mass storage, backup storage, user input, network connections, and the I/O adapters therefor, are typically allocated to one or more of the logical partitions 134. Resources may be allocated in a number of manners, e.g., on a bus-by-bus basis, or on a resource-by-resource basis, with multiple logical partitions sharing resources on the same bus. Some resources may even be allocated to multiple logical partitions at a time. The resources identified herein are examples only, and any appropriate resource capable of being allocated may be used.

The capacity on demand manager 135 activates resources (previously described above) that are present at the computer system 100, but dormant or not used, so that the resource may be used and allocated to one or more of the partitions 134. In another embodiment, the partitions 134 are not present or not used, and the hypervisor 136 activates a resource or resources, so that they are available for use by the entire computer system 100. In another embodiment, the capacity on demand manager 135 may activate resources for a network of connected computers, e.g., the network 130.

In an embodiment, at least one of the applications 144 is a performance data collection tool, as further described below with reference to FIG. 2. The application 144 includes instructions capable of executing on the processor 101 or statements capable of being interpreted by instructions executing on the processor 101 to perform the functions as further described below with reference to FIGS. 3, 4, 5, and 6.

In another embodiment, the application 144 may be implemented in microcode or firmware. In another embodiment, the application 144 may be implemented in hardware via logic gates and/or other appropriate hardware techniques. Each of the applications 144 illustrated in FIG. 1 may be the same or some or all of them may be different from each other. Further, each of the partitions 134 may include multiple of the applications 144.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the server 132. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

FIG. 1 is intended to depict the representative major components of the computer system 100, the network 130, and the server 132 at a high level; individual components may have greater complexity than represented in FIG. 1; components other than or in addition to those shown in FIG. 1 may be present; and the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
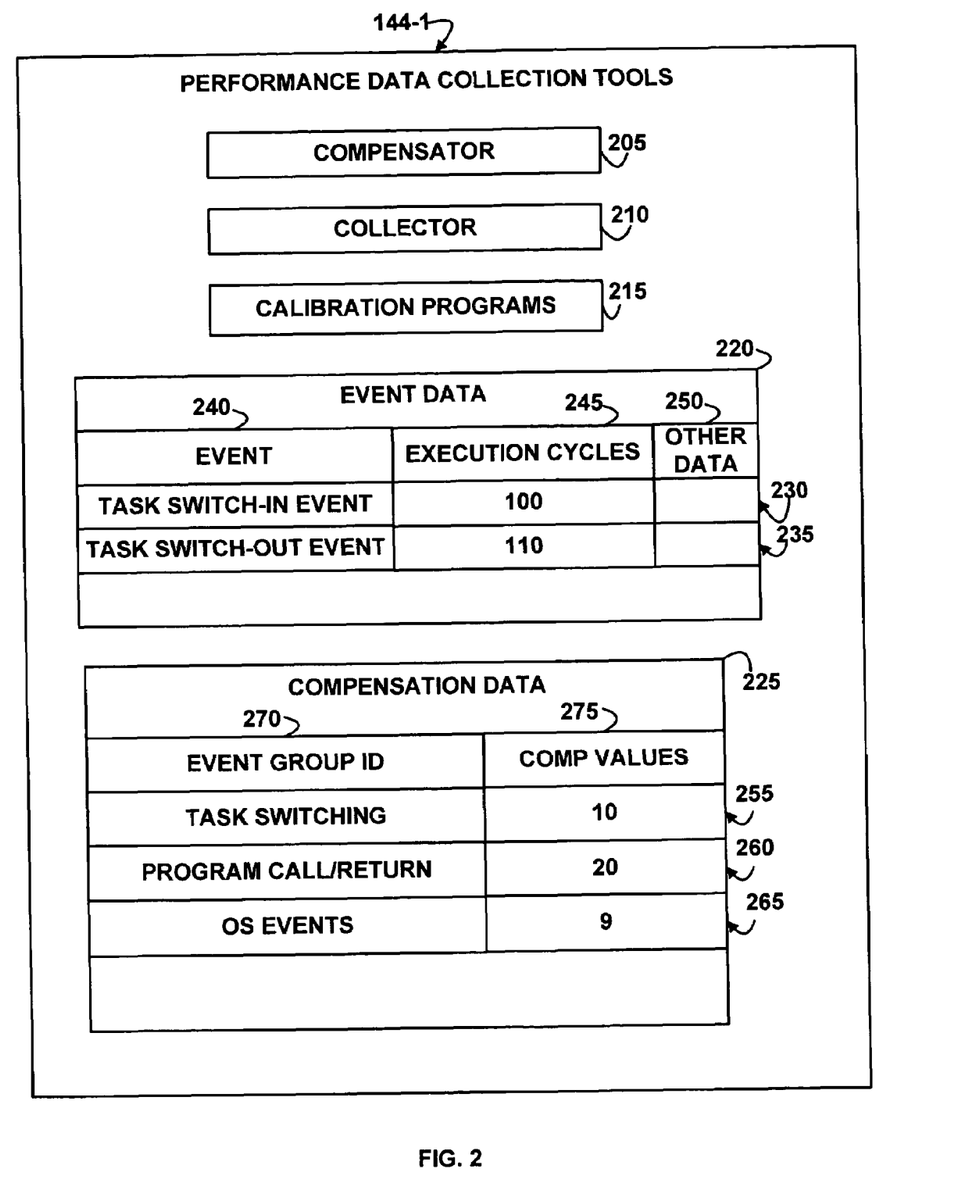
FIG. 2 depicts a block diagram of an example performance data collection tool, according to an embodiment of the invention.

FIG. 2 depicts a block diagram of an example performance data collection tool 144-1, according to an embodiment of the invention. The performance data collection tool 144-1 is an example of the application 144, as previously described above with reference to FIG. 1. The performance data collection tool 144-1 includes a compensator 205, a collector 210, calibration programs 215, event data 220, and compensation data 225.

The calibration programs 215 are a predefined set of applications with known performance characteristics that exercise functions in the computer 100, the network 130, and/or the server 132 in order to cause events that the collector 210 may detect (if the collector 210 is active) and record in the event data 220. The compensator 205 adjusts the event data 220 using the compensation data 225.

The event data 220 includes records 230 and 235, but in other embodiments any number of records with any type of data may be present. The records 230 and 235 are created by the collector 210 in response to events caused by the software and/or hardware of the computer system 100, the network 130, and/or the server 132. Each of the records 230 and 235 includes an event field 240, an execution cycles field 245, and optional other data 250. The event field 240 indicates a type of the event encountered, performed, generated by the hardware and/or software of the computer system 100, the network 130, and/or the server 132, as detected by the collector 210. The execution cycles 245 indicates the number of processor cycles used, e.g., by the processor 101 while encountering, performing, generating, or processing the event 240. The other data 250 may include any other type of data associated with the event 240.

The compensation data 225 includes records 255, 260, and 265, but in other embodiments any number of records with any type of data may be present. Each of the records 255, 260, and 265 includes an event group identifier 270 and a compensation value 275. The event group identifier 270 indicates a group to which the events described in the event 240 belong. For example, the task switch-in event of record 230 and the task switch-out event of record 235 both belong to the task switching group of record 255. The compensation value field 275 indicates a number by which the execution cycles 245 needs to be adjusted in order to accurately reflect the number of processor cycles used by events that belong to the associated event group identifier 270. The compensator 205 determines the compensation values 275 as further described below with reference to FIGS. 5 and 6. Thus, all events 240 associated with a particular event group 270 share the same compensation value 275.

Figure 3:
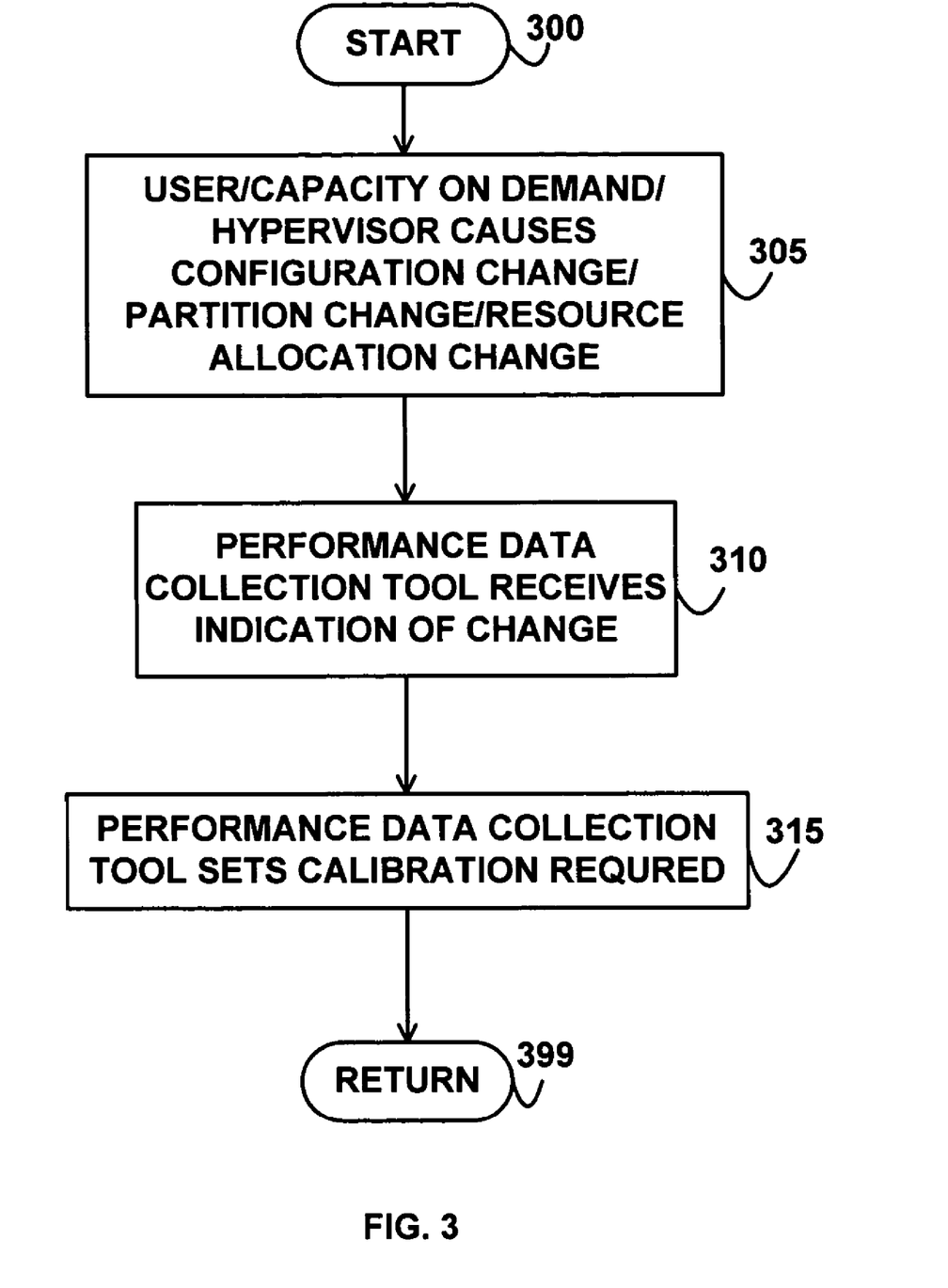
FIG. 3 depicts a flowchart of example processing for responding to a configuration change, a partition change, or a resource allocation change, according to an embodiment of the invention.

FIG. 3 depicts a flowchart of example processing for responding to a configuration change, a partition change, or a resource allocation change, according to an embodiment of the invention. Control begins at block 300. Control then continues to block 305 where a user, the capacity on demand manager 135, the hypervisor 136, or any other appropriate functions causes a configuration change to the computer 100, a change to one of the partitions 134, a change to the resources allocated among the partitions 134, or a change to the resources activated at the computer 100. Control then continues to block 310 where the performance data collection tool 144-1 receives an indication of the change that previously occurred at block 305. Control then continues to block 315 where the performance data collection tool 144-1 sets an indicator that calibration is required. Control then continues to block 399 where the logic of FIG. 3 returns.

Figure 4:
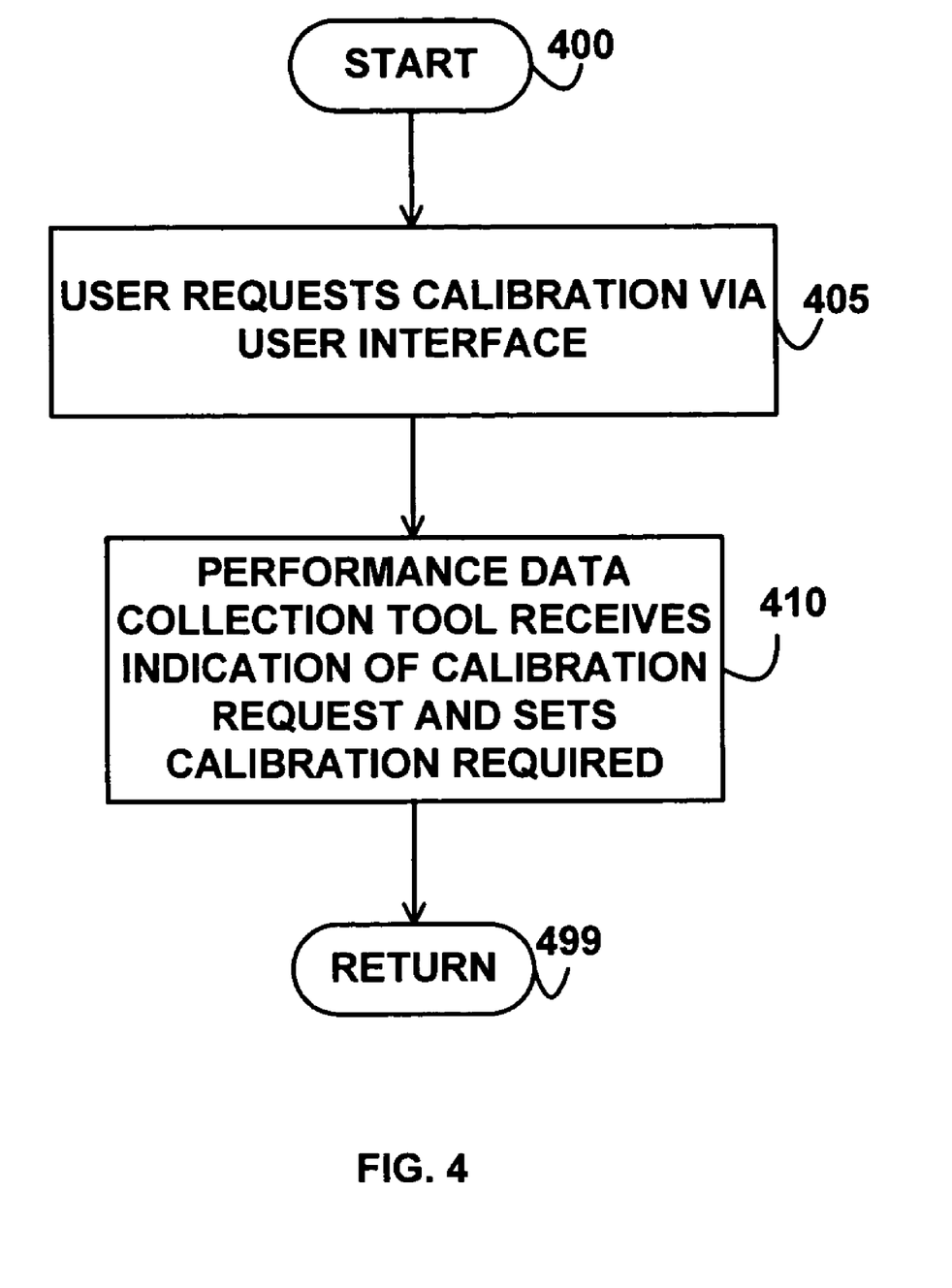
FIG. 4 depicts a flowchart of example processing for responding to a request for calibration, according to an embodiment of the invention.

FIG. 4 depicts a flowchart of example processing for responding to a request for calibration, according to an embodiment of the invention. Control begins at block 400. Control then continues to block 405 where the user requests calibration via a user interface. Control then continues to block 410 where the performance data collection tool 144-1 receives an indication of the calibration request, previously requested at block 405, and sets an indicator that calibration is required. Control then continues to block 499 where the logic of FIG. 4 returns.

Figure 5:
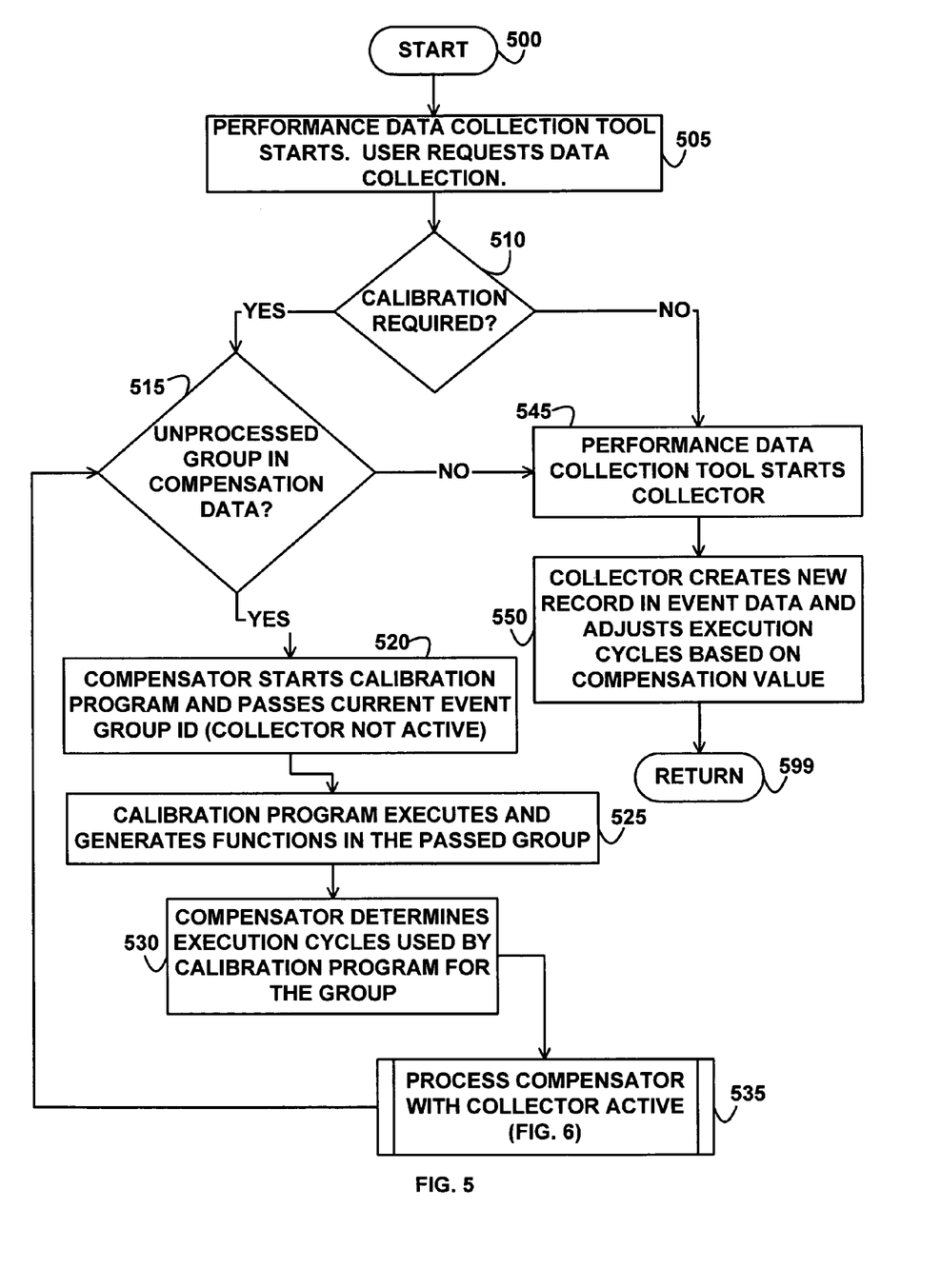
FIG. 5 depicts a flowchart of example processing for responding to a request for data collection, according to an embodiment of the invention.

FIG. 5 depicts a flowchart of example processing for responding to a request for data collection, according to an embodiment of the invention. Control begins at block 505 where the performance data collection tool 144-1 starts and the user or any appropriate application or function requests data collection. Control then continues to block 510 where the performance data collection tool 144-1 determines whether calibration is required (e.g., as previously described above with reference to FIGS. 3 and 4). If the determination at block 510 is true, then calibration is required, so control continues to block 515 where the performance data collection tool 144-1 determines whether a group 270 exists in a record in the compensation data 225 that is unprocessed by the logic of FIG. 5.

If the determination at block 515 is true, then an unprocessed group does exist in the compensation data 225, so control continues to block 520 where the compensator 205 starts a calibration program 215 and passes the current event group identifier 270 to the calibration program 215 without the collector 210 being active. Control then continues to block 525 where the calibration program 215 executes and generates functions in the operating system 142, the application 144, or any software and/or hardware component of the computer 100, the network 130, and/or or the server 132 that generate events associated with the passed group 270. In another embodiment each group has its own associated calibration program 215. Control then continues to block 530 where the compensator 205 determines the number of execution cycles used by the calibration program 215 for the group 270. Control then continues to block 535 where the compensation values 275 are calculated when a collector 210 is active, as further described below with reference to FIG. 6. Control then returns to block 515, as previously described above.

If the determination at block 515 is false, then all groups 270 in the compensation data 225 have been processed by the logic of FIG. 5, so control continues to block 545 where the performance data collection tool 144-1 starts the collector 210. Control then continues to block 550 where (in response to an event caused by the operating system 142, the application 144, or any software and/or hardware component of the computer 100, the network 130, and/or or the server 132) the collector 210 creates a new record, such as the record 230 or 235, associated with the event 240 in the event data 220, determines the execution cycles consumed by the event 240, determines the event group 270 to which the event 240 belongs, and adjusts the execution cycles 245 in the newly created record in the event data 220 based on the compensation value 275 associated with the event group 270 to which the event 240 belongs. For example, the collector 210 subtracts the compensation value 275 for the group from the detected execution cycles and stores the result in the execution cycles 245. Control then continues to block 599 where the logic of FIG. 5 returns.

If the determination at block 510 is false, then calibration is not required, so control continues to block 545, as previously described above.

Figure 6:
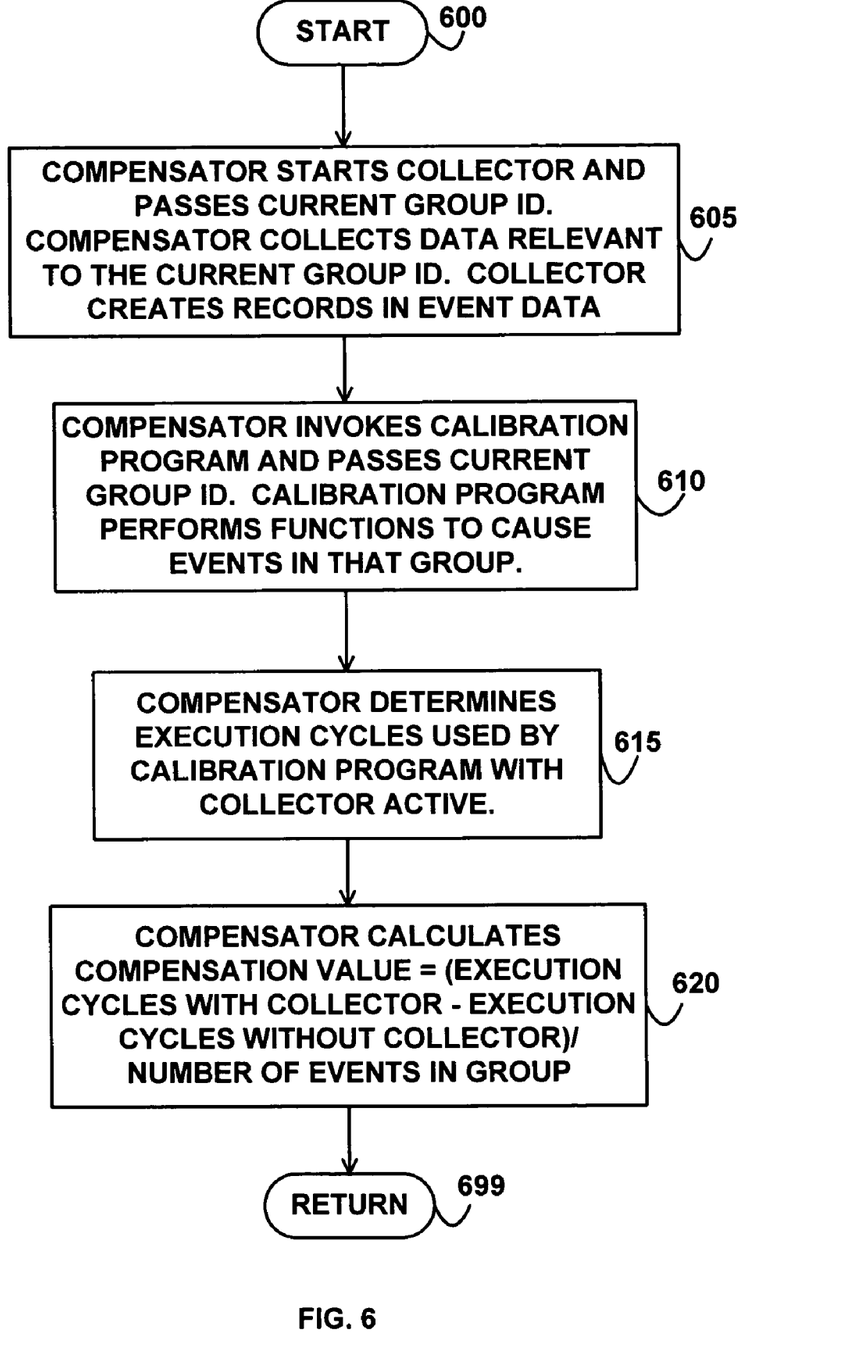
FIG. 6 depicts a flowchart of example processing for calculating compensation values when a collector is active, according to an embodiment of the invention.

FIG. 6 depicts a flowchart of example processing for calculating compensation values when the collector 210 is active, according to an embodiment of the invention. Control begins at block 600. Control then continues to block 605 where the compensator 205 starts the collector 210 and passes the current event group identifier 270. The compensator 205 collects data relevant to the current event group identifier 270. The collector 210 also creates associated records in the event data 220.

Control then continues to block 610 with the compensator 205 invokes the calibration program 215 and passes the current event group identifier 270. The calibration program 215 performs functions to cause events in that group. Control then continues to block 615 where the compensator 205 determines the number of execution cycles of the processor 101 used by the calibration program 215 for the current group 270 with the collector 210 active. Control then continues to block 620 where the compensator 205 calculates the compensation value to be the execution cycles with the collector 210 active minus the execution cycles without the collector active 210 divided by the number of events that occurred in the group. The compensator 205 further stores the calculated compensation value in the compensation value field 275. Control then continues to block 699 where the logic of FIG. 6 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
    passing a plurality of identifiers of a plurality of respective event groups to a calibration program;
    determining a plurality of first numbers of processor execution cycles used by the calibration program that performs functions that cause events in the plurality of respective event groups with a collector inactive;
    after the determining the plurality of first numbers of processor execution cycles, starting the collector and passing the plurality of identifiers of the plurality of respective event groups to the collector;
    determining a plurality of second numbers of processor execution cycles used by the calibration program that performs the functions that cause the events in the plurality of respective event groups with the collector active, wherein the collector detects the events in the plurality of respective event groups identified by the plurality of identifiers and creates data associated with the events;
    calculating a respective compensation value for each of the respective event groups to be a respective difference between the respective first number of processor execution cycles and the respective second number of processor execution cycles divided by a number of events in the respective group;
    after the calculating, detecting an collected event caused by an application;
    determining the event group to which the collected event belongs;
    determining a collected number of processor execution cycles used by processing the collected event;
    subtracting the compensation value associated with the event group to which the collected event belongs from the collected number of processor execution cycles; and
    storing a result of the subtracting the compensation value.

2. The method of claim 1, further comprising:
    deciding whether to perform the passing, the determining the plurality of first numbers, the determining the plurality of second numbers, and the calculating.

3. The method of claim 2, wherein the deciding further comprises:
    deciding whether a configuration of a computer changed.

4. The method of claim 2, wherein the deciding further comprises:
    deciding whether resource allocation among logical partitions of a computer changed.

5. The method of claim 2, wherein the deciding further comprises:
    deciding whether a resource was activated under a capacity on demand plan.

6. A computer readable medium encoded with instructions, wherein the instructions when executed comprise:
    passing a plurality of identifiers of a plurality of respective event groups to a calibration program;
    determining a plurality of first numbers of processor execution cycles used by the calibration program that performs functions that cause events in the plurality of respective event groups with a collector inactive;
    after the determining the plurality of first numbers of processor execution cycles, starting the collector and passing the plurality of identifiers of the plurality of respective event groups to the collector,
    determining a plurality of second numbers of processor execution cycles used by the calibration program that performs the functions that cause the events in the plurality of respective event groups with the collector active, wherein the collector detects the events in the plurality of respective event groups identified by the plurality of identifiers and creates data associated with the events;
    calculating a respective compensation value for each of the respective event groups to be a respective difference between the respective first number of processor execution cycles and the respective second number of processor execution cycles divided by a number of events in the respective group;
    after the calculating, detecting an collected event caused by an application;
    determining the event group to which the collected event belongs;
    determining a collected number of processor execution cycles used by processing the collected event;
    subtracting the compensation value associated with the event group to which the collected event belongs from the collected number of processor execution cycles; and
    storing a result of the subtracting the compensation value.

7. The computer readable medium of claim 6, further comprising:
    deciding whether to perform the passing, the determining the plurality of first numbers, the determining the plurality of second numbers, and the calculating.

8. The computer readable medium of claim 7, wherein the deciding further comprises:
    deciding whether a configuration of a computer changed.

9. The computer readable medium of claim 7, wherein the deciding further comprises:
    deciding whether resource allocation among logical partitions of a computer changed.

10. The computer readable medium of claim 7, wherein the deciding further comprises:
    deciding whether a resource was activated under a capacity on demand plan.

11. A method for configuring a computer, comprising:
    configuring the computer to pass a plurality of identifiers of a plurality of respective event groups to a calibration program;
    configuring the computer to determine a plurality of first numbers of processor execution cycles used by the calibration program that performs functions that cause events in the plurality of respective event groups with a collector inactive;
    configuring the computer to, after the determining the plurality of first numbers of processor execution cycles, start the collector and pass the plurality of identifiers of the plurality of respective event groups to the collector;

configuring the computer to determine a plurality of second numbers of processor execution cycles used by the calibration program that performs the functions that cause the events in the plurality of respective event groups with the collector active, wherein the collector detects the events in the plurality of respective event groups identified by the plurality of identifiers and creates data associated with the events;

configuring the computer to calculate a respective compensation value for each of the respective event groups to be a respective difference between the respective first number of processer execution cycles and the respective second number of processor execution cycles divided by a number of events in the respective group;

configuring the computer to, after the configuring the computer to calculate, detect an collected event caused by an application;

configuring the computer to determine the event group to which the collected vent belongs;

configuring the computer to determine a collected number of processor execution cycles used by processing the collected event;

configuring the computer to subtract the compensation value associated with the event group to which the collected event belongs from the collected processor execution cycles; and configuring the computer to store a result of the subtracting the compensation value.

12. The method of claim 11, further comprising:

configuring the computer to decide whether to perform the pass of the plurality of identifiers of the plurality of respective event groups to the calibration program, and the calculate of the respective compensation value.

13. The method of claim 12, wherein the configuring the computer to decide further comprises:

configuring the computer to decide whether a configuration of the computer changed.

14. The method of claim 12, wherein the configuring the computer to decide further comprises:

configuring the computer to decide whether resource allocation among logical partitions of the computer changed.

15. The method of claim 12, wherein the configuring the computer to decide further comprises:

configuring the computer to decide whether a resource was activated under a capacity on demand plan.

* * * * *